United States Patent
Lin et al.

(10) Patent No.: US 11,454,765 B2
(45) Date of Patent: Sep. 27, 2022

(54) FIBER OPTIC ADAPTER AND FIBER OPTIC CONNECTOR

(71) Applicant: SHEN ZHEN WONDERWIN TECHNOLOGY CO., LTD., Shenzhen (CN)

(72) Inventors: Jim Lin, Kaohsiung (TW); Ke-Xue Ning, Shenzhen (CN); Xiang-Xu Zeng, Shenzhen (CN)

(73) Assignee: SHEN ZHEN WONDERWIN TECHNOLOGY CO., LTD., Shenzhen (CN)

( * ) Notice: Subject to any disclaimer, the term of this patent is extended or adjusted under 35 U.S.C. 154(b) by 79 days.

(21) Appl. No.: 17/023,031

(22) Filed: Sep. 16, 2020

(65) Prior Publication Data
US 2021/0157061 A1   May 27, 2021

(30) Foreign Application Priority Data
Nov. 26, 2019   (TW) .................. 108215668

(51) Int. Cl.
*G02B 6/38* (2006.01)
(52) U.S. Cl.
CPC ......... *G02B 6/3831* (2013.01); *G02B 6/3825* (2013.01)
(58) Field of Classification Search
CPC ............................ G02B 6/3825; G02B 6/3831
USPC ........................................................ 385/134
See application file for complete search history.

(56) References Cited

U.S. PATENT DOCUMENTS

| | | | | |
|---|---|---|---|---|
| 9,933,586 B1* | 4/2018 | Yang | .................... | G02B 6/3825 |
| 10,146,012 B2* | 12/2018 | Takano | ................ | G02B 6/3893 |
| 2001/0026661 A1* | 10/2001 | de Jong | ............... | G02B 6/3831 |
| | | | | 385/56 |
| 2003/0165298 A1* | 9/2003 | Ngo | ...................... | G02B 6/3897 |
| | | | | 385/53 |
| 2015/0003785 A1* | 1/2015 | Raven | .................. | G02B 6/3825 |
| | | | | 385/62 |
| 2016/0259135 A1* | 9/2016 | Gniadek | .............. | G02B 6/3885 |
| 2018/0149813 A1* | 5/2018 | Yang | .................... | G02B 6/3825 |
| 2019/0154924 A1* | 5/2019 | Chang | ................. | G02B 6/3893 |
| 2019/0154930 A1* | 5/2019 | Ho | ........................ | G02B 6/4256 |
| 2019/0377139 A1* | 12/2019 | Chang | ................. | G02B 6/3898 |
| 2020/0166716 A1* | 5/2020 | Chang | ................. | G02B 6/3825 |
| 2020/0183093 A1* | 6/2020 | Chang | ................. | G02B 6/3825 |
| 2020/0301079 A1* | 9/2020 | Leigh | .................. | G02B 6/3851 |
| 2020/0310041 A1* | 10/2020 | Chang | ................. | G02B 6/3821 |
| 2021/0173154 A1* | 6/2021 | Otomitsu | ............. | G02B 6/3885 |

* cited by examiner

*Primary Examiner* — Kaveh C Kianni
(74) *Attorney, Agent, or Firm* — Muncy, Geissler, Olds & Lowe, P.C.

(57) ABSTRACT

A fiber optic adapter includes a surrounding wall defining a communication space, two first protruding walls located in the communication space and connected to the surrounding wall, two second protruding walls located in the communication space and connected to the surrounding wall, and an error-proofing protrusion disposed on the surrounding wall, and located in a first key groove between the first protruding walls.

3 Claims, 7 Drawing Sheets

FIBER OPTIC ADAPTER AND FIBER OPTIC CONNECTOR

CROSS-REFERENCE TO RELATED APPLICATION

This application claims priority to Taiwanese Utility Model Patent Application No. 108215668, filed on Nov. 26, 2019.

FIELD

The disclosure relates to fiber optic components, and more particularly to a fiber optic adapter and a fiber optic connector.

BACKGROUND

A conventional ingress-protection adapter has outstanding water-proofing effect, is adapted to be placed at open-air or humid places, and is used to connect Mechanical Transfer (MT), Lucent Connector/Local Connector (LC) or Subscriber Connector/Standard Connector (SC) type fiber optic connectors. The conventional adapter cannot be installed reversely (upside-down) in order to prevent the single-core LC and SC type fiber optic connectors from being set reversely and to achieve an error-proofing effect. However, the MT type fiber optic connector has twelve cores, and has two different polarities when it is set normally and reversely. But since setting the MT type fiber optic connector reversely is not allowed by the conventional adapter, the MT type fiber optic connector cannot invert the polarity thereof rapidly on the conventional adapter. The MT type fiber optic connector includes a ferrule, and an orientation key that is able to be mounted to either one of two opposite ends of the ferrule in a transverse direction of the ferrule. When polarity inversion is necessary, the MT type fiber optic connector has to be separated from the conventional adapter, and the orientation key is demounted from the ferrule and remounted to the other one of the opposite ends of the ferrule before the MT type fiber optic connector is connected to the conventional adapter again, so that the polarity inversion can be done. Thus, not only is the process of inverting polarity mentioned above time-consuming, the cost of production and the probability of missing elements are increased because the MT type fiber optic connector needs an extra design of a knockdown structure for the orientation key and because a simpler integrated design cannot be adapted.

SUMMARY

Therefore, an object of the disclosure is to provide a fiber optic adapter that can alleviate at least one of the drawbacks of the prior art.

According to the disclosure, the fiber optic adapter includes a surrounding wall, two first protruding walls, two second protruding walls and an error-proofing protrusion. The surrounding wall defines a communication space that extends in a front-rear direction. The first protruding walls are located in the communication space and are connected to the surrounding wall. The first protruding walls are spaced apart from each other in a left-right direction that is transverse to the front-rear direction, and cooperate with the surrounding wall to define a first key groove that extends in the front-rear direction. The second protruding walls are located in the communication space and are connected to the surrounding wall. Each of the second protruding walls is located above a respective one of the first protruding walls. The second protruding walls are spaced apart from each other in the left-right direction, and cooperate with the surrounding wall to define a second key groove that extends in the front-rear direction and that is located above the first key groove. The error-proofing protrusion is disposed on the surrounding wall, is located in the first key groove, and extends in the front-rear direction.

Another object of the disclosure is to provide a fiber optic connector that can alleviate at least one of the drawbacks of the prior art.

According to the disclosure, the fiber optic connector is adapted for use with the abovementioned fiber optic adapter, and includes an outer casing and an orientation key. The outer casing extends in a front-rear direction, and is adapted to removably engage the communication space of the fiber optic adapter. The orientation key is disposed on the outer casing, and is formed with an open groove that opens toward a distal end of the fiber optic connector. The orientation key is adapted to removably engage either one of the first key groove and the second key groove of the fiber optic adapter. The open groove is adapted to permit the error-proofing protrusion of the fiber optic adapter to be inserted therein.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
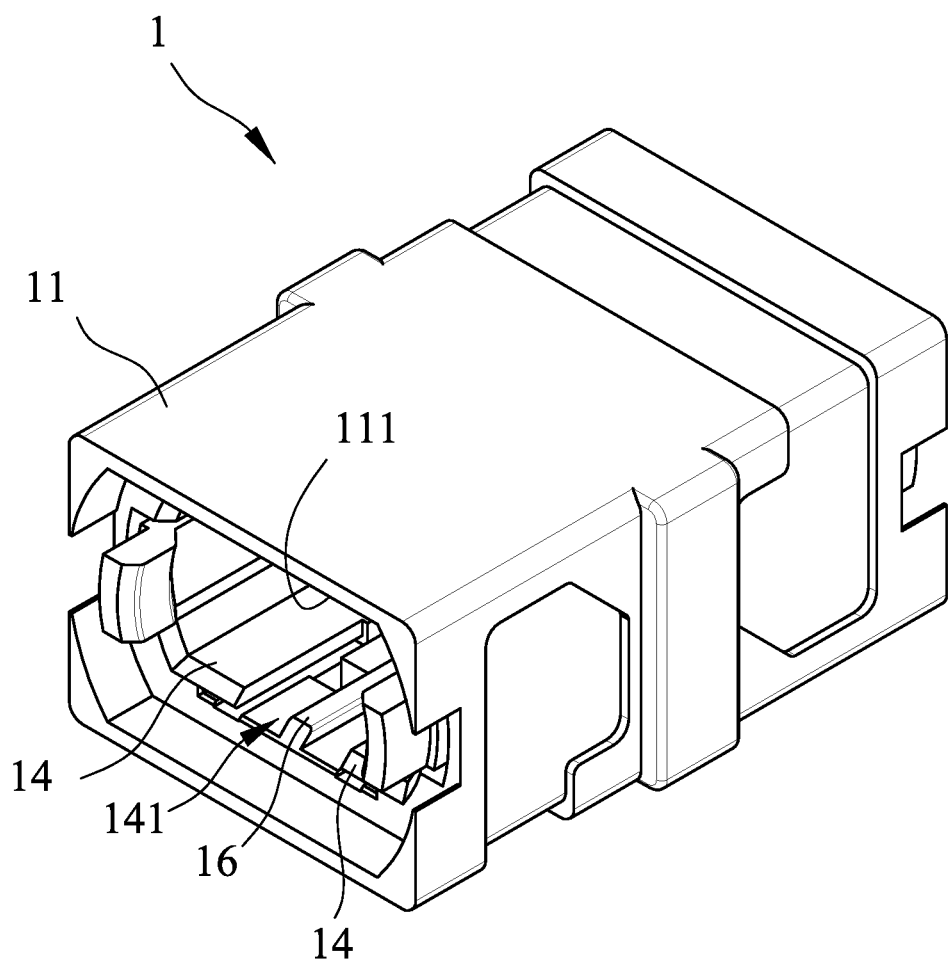
FIG. 1 is a perspective view illustrating an embodiment of a fiber optic adapter according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
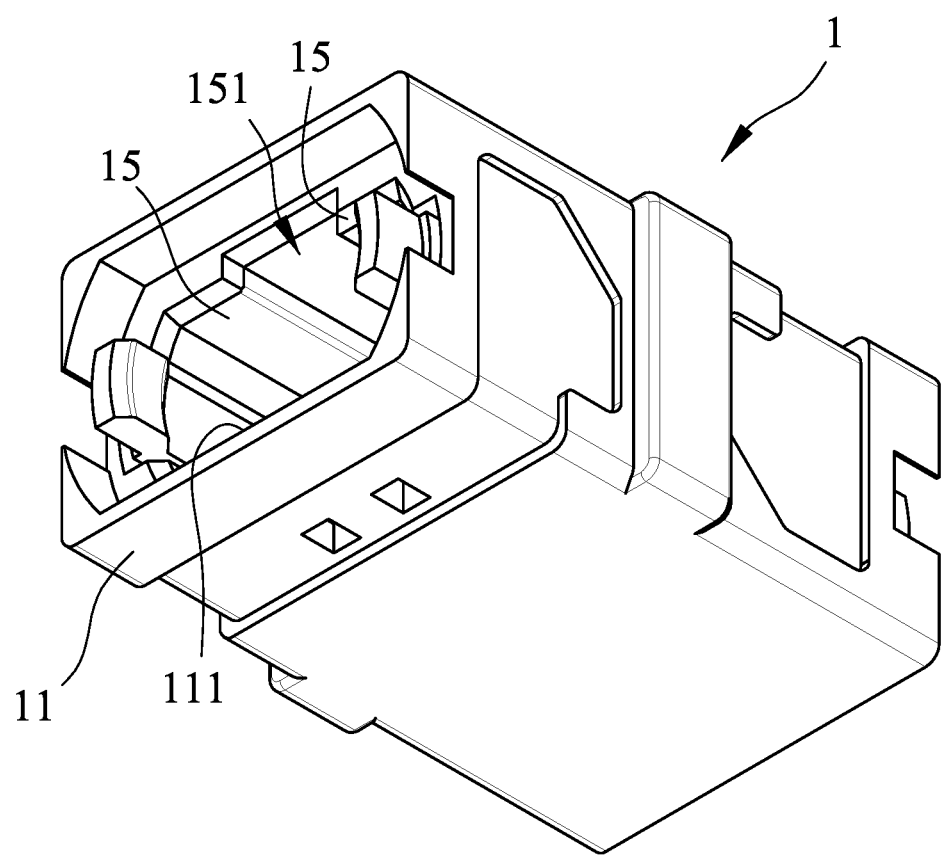
FIG. 2 is another perspective view illustrating the embodiment.
Figure 3:
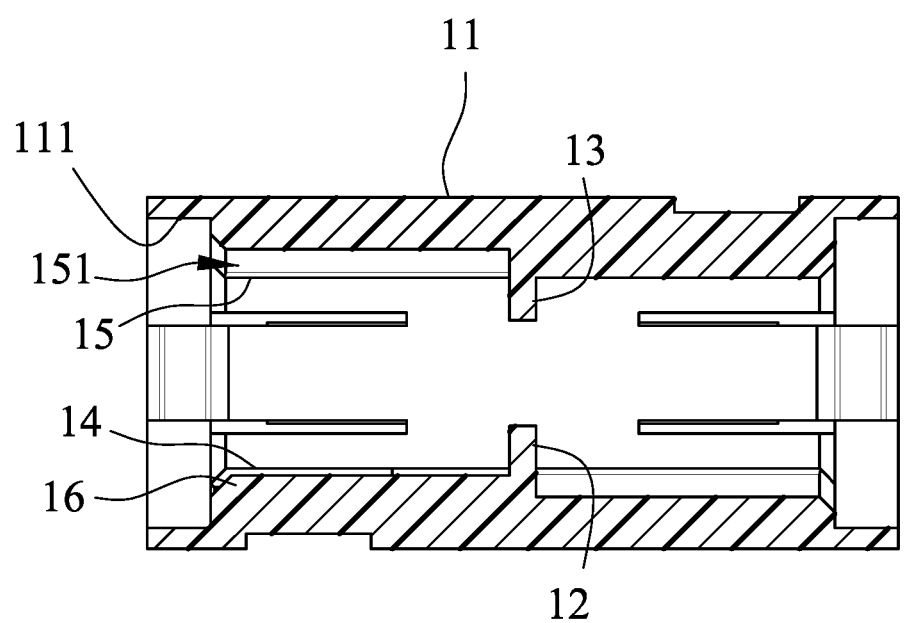
FIG. 3 is a sectional view illustrating the embodiment.

Referring to FIGS. 1, 2 and 3, an embodiment of a fiber optic adapter 1 according to the disclosure includes a surrounding wall 11, a first blocking wall 12, a second blocking wall 13, two first protruding walls 14, two second protruding walls 15 and an error-proofing protrusion 16. The surrounding wall 11 defines a communication space 111 that extends in a front-rear direction. The first blocking wall 12 is disposed on the surrounding wall 11, is located in the communication space 111 and extends in a left-right direction that is transverse to the front-rear direction. The second blocking wall 13 is disposed on the surrounding wall 11, is located above the first blocking wall 12 and extends in the left-right direction. Two first protruding walls 14 are located in the communication space 111, are connected to the surrounding wall 11, and respectively extend through the first blocking wall 12 in the front-rear direction.

Two second protruding walls 15 are located in the communication space 111, are connected to the surrounding wall 11, and extend forwardly from the second blocking wall 13. The error-proofing protrusion 16 is disposed on the surrounding wall 11 and is located between the first protruding walls 14.

The first blocking wall 12 and the second blocking wall 13 are spaced apart from each other in an above-below direction. The first protruding walls 14 are spaced apart from each other in the left-right direction, and cooperate with an inner surface of the surrounding wall 11 and the first blocking wall 12 to define a first key groove 141 that extends in the front-rear direction. The second protruding walls 15 are spaced apart from each other in the left-right direction, and cooperate with the inner surface of the surrounding wall 11 and the second blocking wall 13 to define a second key groove 151 that extends in the front-rear direction. The length of the second protruding walls 15 in the front-rear direction is different from that of the first protruding walls 14, and the second protruding walls 15 are spaced apart from the first protruding walls 14 in the above-below direction. The error-proofing protrusion 16 is located in the first key groove 141 and extends forwardly from the first blocking wall 12.

Figure 4:
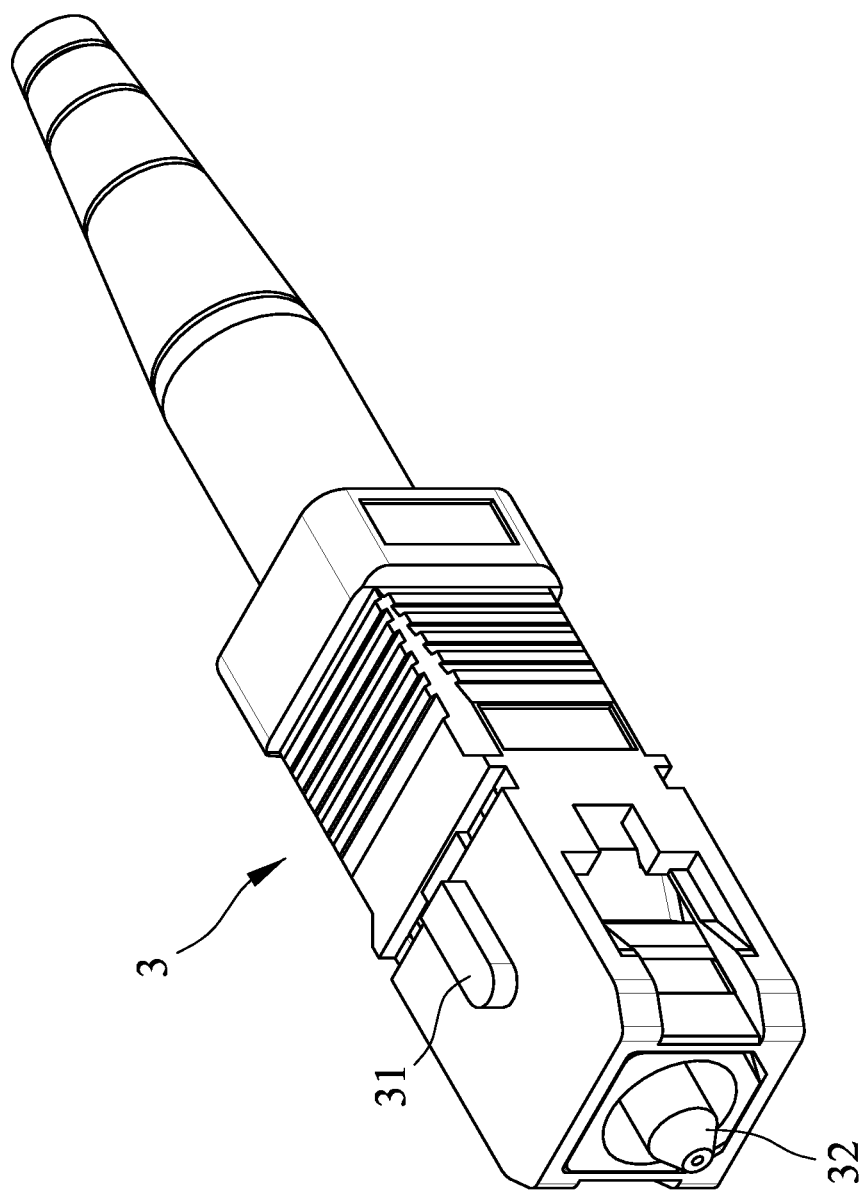
FIG. 4 is a perspective view illustrating a conventional fiber optic connector.

Referring to FIGS. 1, 3 and 4, the fiber optic adapter 1 is adapted to permit a conventional MT, LC or SC type connector 3 to be inserted in the communication space 111, and a SC type connector 3 is taken as an example in FIG. 4. When the connector 3 is inserted into the communication space 111 in a normal orientation, a fool-proofing protrusion 31 above the connector 3 will be inserted into the second key groove 151 in the front-rear direction, allowing the connector 3 to be inserted unhinderedly, and a core 32 of the connector 3 can pass through a gap between the first blocking wall 12 and the second blocking wall 13 for connection. However, when the connector 3 is inserted into the communication space 111 in a reverse orientation (i.e., upside-down), the fool-proofing protrusion 31 will be blocked by the error-proofing protrusion 16 in the first key groove 141, preventing the connector 3 from being inserted into the communication space 111 successfully, and achieving the fool-proofing effect. Therefore, the fiber optic adapter 1 according to the disclosure can be used with commercially available types of conventional connectors 3, allowing the conventional connectors 3 to successfully achieve their fool-proofing function.

Figure 5:
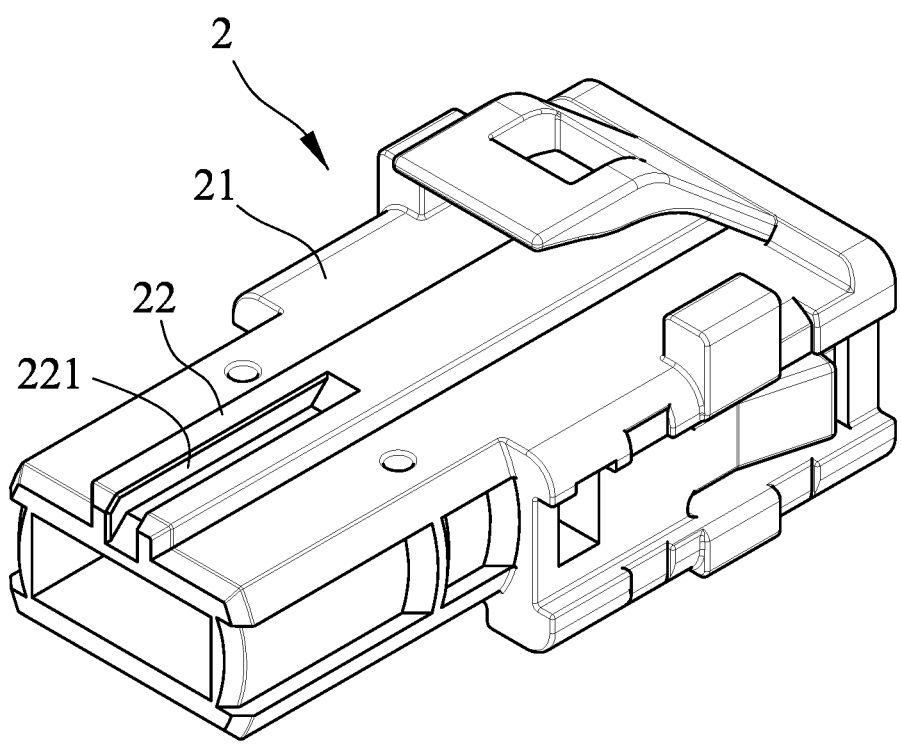
FIG. 5 is a perspective view illustrating an embodiment of a fiber optic connector according to the disclosure.

Referring to FIG. 5, an embodiment of a fiber optic connector 2 according to the disclosure includes an outer casing 21 extending in a front-rear direction, and an orientation key 22 disposed on an upper surface of the outer casing 21 and extending in the front-rear direction. The orientation key 22 extends rearwardly from a front surface of the outer casing 21, and is formed with an open groove 221 that opens upwards and forwards (i.e., the open groove 221 opens toward a distal end of the fiber optic connector 2).

Figure 6:
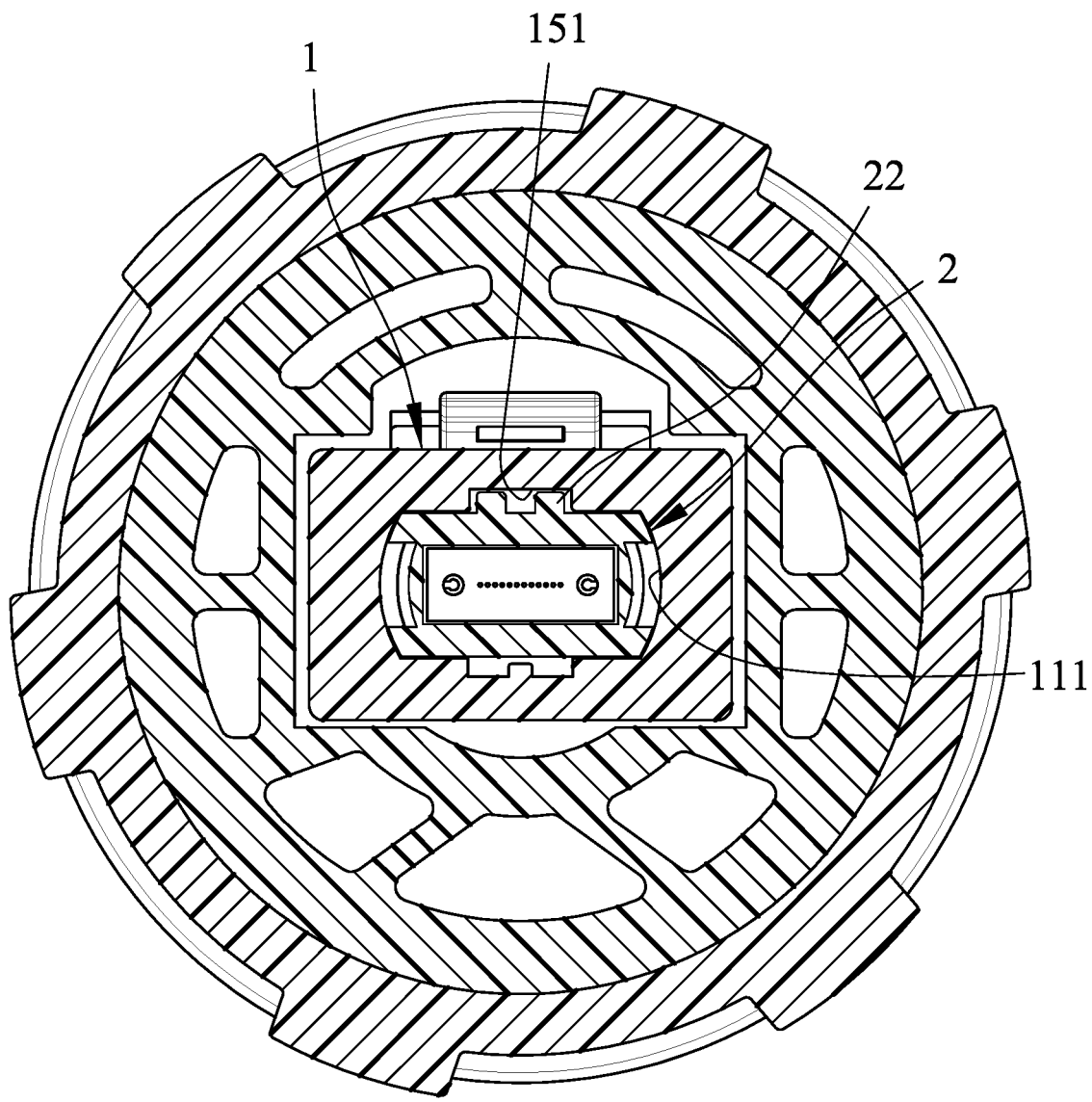
FIG. 6 is a sectional view illustrating the embodiment of the fiber optic connector being inserted into the fiber optic adapter in a normal orientation.
Figure 7:
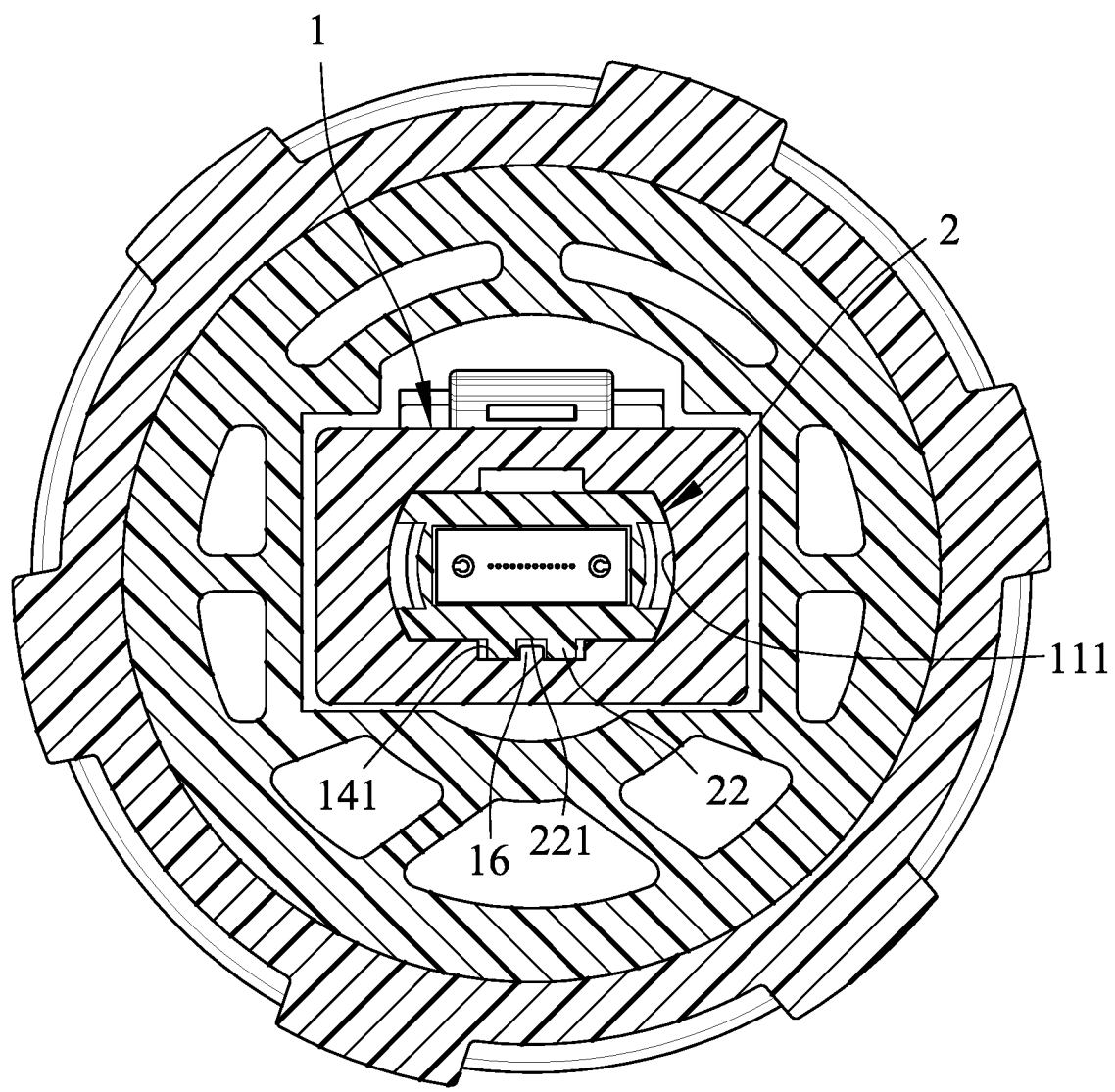
FIG. 7 is a sectional view illustrating the embodiment of the fiber optic connector being inserted into the fiber optic adapter in a reverse orientation.

Referring to FIGS. 5, 6, and 7, when the fiber optic connector 2 is inserted into the communication space 111 of the fiber optic adapter 1 in a normal orientation as shown in FIG. 6, the orientation key 22 is inserted into the second key groove 151 in the front-rear direction, allowing the fiber optic connector 2 to be inserted into the fiber optic adapter 1 unhinderedly. When the fiber optic connector 2 is inserted into the fiber optic adapter 1 in a reverse orientation (i.e., upside-down) as shown in FIG. 7, the orientation key 22 is inserted into the first key groove 141 in the front-rear direction, and the error-proofing protrusion 16 is inserted into the open groove 221 of the orientation key 22, stopping the error-proofing protrusion 16 from blocking the orientation key 22, so the fiber optic connector 2 can be inserted into the communication groove 111 of the fiber optic adapter 1 in the reverse orientation unhinderedly. Therefore, the fiber optic connector 2 according to the disclosure can achieve the effect of inverting polarity rapidly by simply being inserted into the fiber optic adapter 1 in the reverse orientation. Additionally, the fiber optic connector 2 can be adapted for conventional types of fiber optic adapters, and thus has generality.

In summary, the fiber optic adapter 1 according to the disclosure achieves the fool-proofing and debugging effect to conventional types of connectors by virtue of the error-proofing protrusion 16. Moreover, the open groove 221 of the fiber optic connector 2 can match the error-proofing protrusion 16, allowing the fiber optic connector 2 to be inserted even it is oriented upside-down, and achieving the effect of inverting polarity rapidly. Therefore, it can certainly fulfill the purpose of the disclosure.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fiber optic adapter comprising:
    a surrounding wall defining a communication space that extends in a front-rear direction;
    two first protruding walls located in the communication space and connected to the surrounding wall, the first protruding walls being spaced apart from each other in a left-right direction that is transverse to the front-rear direction, and cooperating with the surrounding wall to define a first key groove that extends in the front-rear direction;
    two second protruding walls located in the communication space and connected to the surrounding wall, each of the second protruding walls being located above a respective one of the first protruding walls, the second protruding walls being spaced apart from each other in the left-right direction, and cooperating with the surrounding wall to define a second key groove that extends in the front-rear direction and that is located above the first key groove; and
    an error-proofing protrusion disposed on the surrounding wall, located in the first key groove, and extending in the front-rear direction;

wherein the fiber optic adapter further comprises a first blocking wall that is disposed on the surrounding wall, that is located in the communication space and that extends in the left-right direction, the first blocking wall permitting the first protruding walls to extend therethrough, the first blocking wall being connected to the error-proofing protrusion.

2. The fiber optic adapter as claimed in claim 1, further comprising a second blocking wall that is disposed on the surrounding wall, that is located above the first blocking wall and that extends in the left-right direction, the second blocking wall being connected to the second protruding walls.

3. A fiber optic connector adapted for use with a fiber optic adapter, the fiber optic adapter comprising:

a surrounding wall defining a communication space extending in a front-rear direction;

two first protruding walls located in the communication space and connected to the surrounding wall, the first protruding walls being spaced apart from each other in a left-right direction transverse to the front-rear direction, and cooperating with the surrounding wall to define a first key groove extending in the front-rear direction;

two second protruding walls located in the communication space and connected to the surrounding wall, each of the second protruding walls being located above a respective one of the first protruding walls, the second protruding walls being spaced apart from each other in the left-right direction, and cooperating with the surrounding wall to define a second key groove that extends in the front-rear direction and that is located above the first key groove; and an error-proofing protrusion disposed on the surrounding wall, located in the first key groove, and extending in the front-rear direction, the fiber optic connector comprising:

an outer casing extending in the front-rear direction, and adapted to removably engage the communication space of the fiber optic adapter; and an orientation key disposed on the outer casing, and formed with an open groove that opens toward a distal end of the fiber optic connector, the orientation key being adapted to removably engage either one of the first key groove and the second key groove of the fiber optic adapter, the open groove being adapted to permit the error-proofing protrusion of the fiber optic adapter to be inserted therein.

* * * * *